United States Patent
McCabe et al.

(10) Patent No.: US 7,686,373 B1
(45) Date of Patent: Mar. 30, 2010

(54) SUN VISOR HANDICAP HANG-TAG HOLDER/DISPLAYER

(76) Inventors: Henry Frank McCabe, 108 Redbud La., Atoka, OK (US) 74525; Cathy Elaine McCabe-McPherson, 108 RedBud La., Atoka, OK (US) 74525

( * ) Notice: Subject to any disclaimer, the term of this patent is extended or adjusted under 35 U.S.C. 154(b) by 0 days.

(21) Appl. No.: 12/055,873

(22) Filed: Mar. 26, 2008

Related U.S. Application Data

(60) Provisional application No. 60/944,720, filed on Jun. 18, 2007.

(51) Int. Cl.
*B60J 3/00* (2006.01)
(52) U.S. Cl. .................. 296/97.6; 40/591; 40/593; 40/643; 40/658; 224/312; 224/277
(58) Field of Classification Search ............... 296/97.1, 296/97.5, 97.6; 40/591, 593, 643, 658; 224/312, 224/227; D12/417
See application file for complete search history.

(56) References Cited

U.S. PATENT DOCUMENTS

| | | | | |
|---|---|---|---|---|
| 1,765,566 A * | 6/1930 | Howard et al. | ............. | 296/95.1 |
| 5,271,653 A * | 12/1993 | Shirley | ....................... | 296/97.8 |
| D436,916 S * | 1/2001 | Eskandry | ................... | D12/417 |
| 6,276,081 B1 * | 8/2001 | Shedd | .......................... | 40/593 |
| 6,708,435 B2 * | 3/2004 | Massey | ........................ | 40/643 |
| 7,150,120 B1 * | 12/2006 | Naymik | ....................... | 40/643 |
| 7,373,745 B1 | 5/2008 | Massaad | | |
| 2002/0038959 A1 * | 4/2002 | Francis et al. | ............... | 296/97.6 |
| 2003/0160474 A1 * | 8/2003 | Palmer et al. | ............... | 296/97.5 |
| 2004/0016162 A1 * | 1/2004 | Rendon | .................... | 40/654.01 |
| 2004/0094588 A1 * | 5/2004 | Klein | .......................... | 224/312 |
| 2006/0204740 A1 * | 9/2006 | Rodewyk et al. | .......... | 428/304.4 |

* cited by examiner

*Primary Examiner*—Patricia L Engle
*Assistant Examiner*—Sunsurraye Westbrook
(74) *Attorney, Agent, or Firm*—Head Johnson & Kachigian, P.C.

(57) ABSTRACT

A combination hang-tag holder and displayer which includes a body; one or more fasteners of sufficient size to attach the body to an automobile sun visor; a hanging device located on the front of the body, either on the left side or right side, such that a hang-tag may be temporarily hung from the hanging device without requiring physical modifications to the hang-tag; and a securing device located on the front of the body on the upper corner opposite the hanging device. The combination hang-tag holder and displayer may be attached to an automobile sun visor, and a hang-tag may be hung from the hanging device for display of the hang-tag. The hang-tag may then be rotated to a horizontal position and secured by the securing device for storage.

12 Claims, 2 Drawing Sheets

SUN VISOR HANDICAP HANG-TAG HOLDER/DISPLAYER

CROSS-REFERENCE TO PENDING APPLICATIONS

This application is based on and is entitled to the filing date of U.S. Provisional Patent Application Ser. No. 60/944,720, filed Jun. 18, 2007.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM LISTING COMPACT DISC APPENDIX

Not Applicable.

BACKGROUND OF THE INVENTION

1. Field of the Invention

This invention relates to devices for holding and displaying handicap hang-tags. In particular, the present invention is directed to a combination holder and display device for vehicle hang-tags.

2. Prior Art

Various state and other laws typically require handicapped drivers or passengers wishing to park in designated handicap parking areas to display a government-issued hang-tag indicating that parking in such areas is permitted. Such hang-tags are generally rectangular in shape and have a notch allowing the hang-tag to be hung from a rear-view mirror. However, driving with the hang-tag in place on the rear-view mirror can be difficult, as the hang-tag is often large and can obstruct the driver's view or otherwise distract the driver. On the other hand, removing the hang-tag when not in use can be bothersome, as the hang-tag may be misplaced or the user may have difficulty applying and removing the hang-tag.

Attempts have been made to solve the problems posed by the storage and display of handicap hang-tags. However, the solutions available to date are unsatisfactory, as they often require permanent alterations to the handicap hang-tag or the vehicle in which it is displayed. Thus, installation may be difficult and the hang-tag may not be capable of being readily moved from one vehicle to another.

Additionally, some jurisdictions require periodic replacement of the hang-tag.

By way of example, Shedd (U.S. Pat. No. 6,276,081) shows one example of a prior art of a hang-tag mounting apparatus which requires defacing the hang-tag and permanently mounting to the vehicle visor.

Based on the foregoing, there is a need for a safe and convenient way to store and display a handicap hang-tag in a vehicle that allows the hang-tag to be easily and clearly displayed, both displayed and stored without undue physical stress, and protected, always in the same place, closed, secure, and out of sight when not in use.

BRIEF SUMMARY OF THE INVENTION

The present invention is a hang-tag holder/displayer comprising a body; one or more fasteners of sufficient size to attach the body to an automobile sun visor; a hanging device located on the front of the body, either on the left side or right side, such that a hang-tag may be temporarily hung from the hanging device without requiring physical modifications to the hang-tag; and a securing device located on the front of the body on the upper corner opposite the hanging device. The hanging device and the securing device may be spaced sufficiently apart such that a hang-tag may be hung from the hanging device and secured by the securing device such that the hang tag is substantially horizontal. The body may be of sufficient size to accommodate the hang tag, but not significantly larger than the automobile sun visor. The body may be made of foam or other similar material, and the one or more fasteners may be elastic bands. The hanging device may be a button type device or a spring-loaded tension device. The securing device may be a clip.

The hang-tag holder/displayer may further comprise a pouch attached to the body. The pouch may be of sufficient size to hold business cards, advertising, appointment cards, or other small items. The pouch may be clear.

The hang-tag holder/displayer is used by lowering an automobile sun visor; attaching the hang tag holder/displayer to the sun visor; hanging a hang-tag from the hanging device such that the hang-tag is in a substantially vertical position; allowing the hang-tag to remain in the substantially vertical position while display of the hang-tag is desired; rotating the hang-tag from the substantially vertical position to a substantially horizontal position toward the securing device when display of the hang-tag is not desired; securing the hang-tag with the securing device; and raising the sun visor to store the secured hang-tag.

DETAILED DESCRIPTION OF THE INVENTION

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's composition and the arrangement of its components without departing from the spirit and scope of this disclosure. It is understood that the invention is not limited to the embodiments set forth herein for purposes of exemplification.

The invention makes it convenient to store and display a state or governmental required handicap hang-tag for vehicles that park in spaces designated as handicap parking. Handicap hang-tags differ but typically are flat with printing on one or both sides and typically include a hook portion to suspend the hang-tag.

The combination holder/displayer spares the driver from having to find a secure location to store the hang-tag, and then to retrieve it and hang it on a rear-view mirror when needed. The holder/displayer secures the state or government mandated hang tag in a safe and convenient manner that allows a handicapped driver or passenger to easily display the hang-tag without undue physical stress. The hang-tag is protected when not in use, always in the same place, and easily displayed. The hang-tag is then closed, secure, and in view of the driver when not in use. Furthermore, the holder/displayer allows for advertising or appointment cards to be displayed in a see-through pouch incorporated therein. The holder/displayer does not require any permanent physical alterations to either the hang-tag or to the vehicle in which it is used, and is easily transferable between vehicles.

Figure 1:
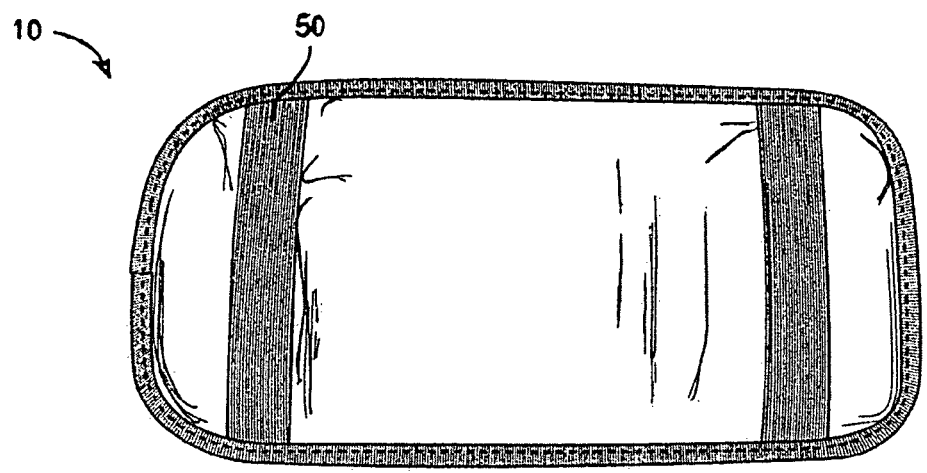
FIG. 1 is a perspective view of the back of a body of the holder/displayed constructed in accordance with the present invention.
Figure 2:
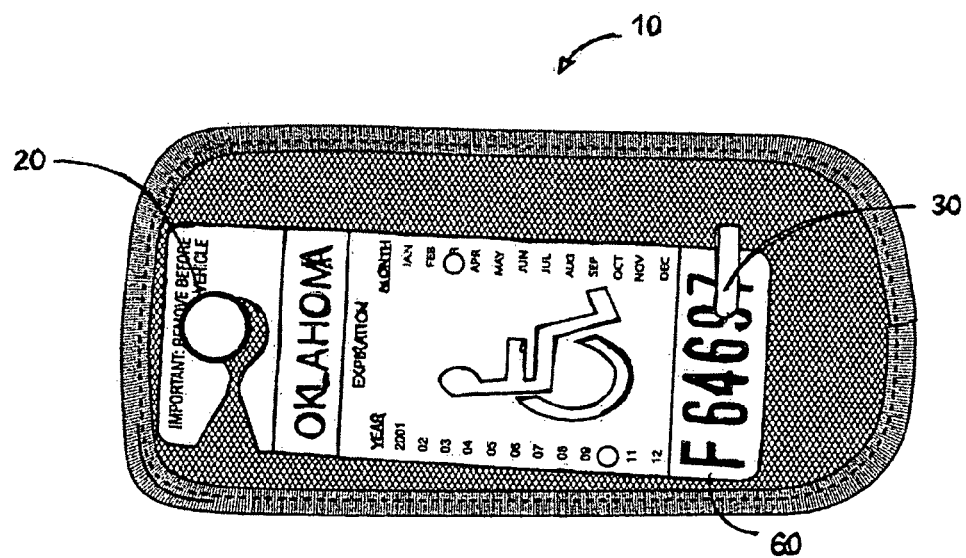
FIG. 2 is a perspective view of the front of the body of the holder/displayer shown in FIG. 1 with a handicap hang-tag hanging therefrom.
Figure 3:
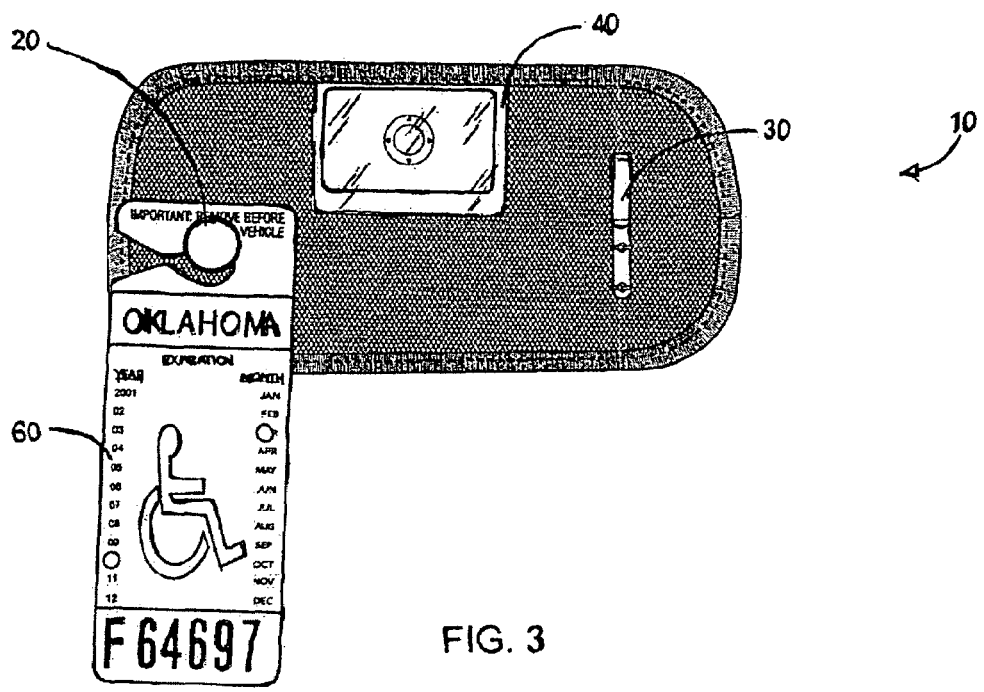
FIG. 3 is a perspective view of the front of the body of the holder/displayer shown in FIG. 1 with a handicap hang-tag secured in a horizontal position, with the hanging device located on the left side of the body.
Figure 4:
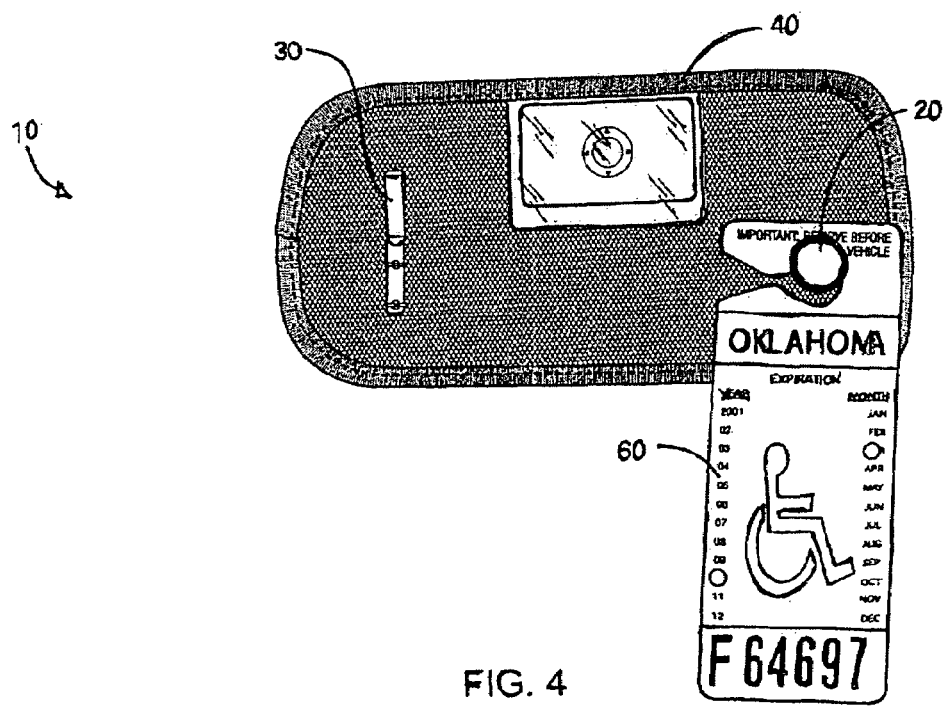
FIG. 4 is a perspective view of the front of the body of the holder/displayer shown in FIG. 1 with a handicap hang-tag secured in a horizontal position, with the hanging device located on the right side of the body.

The holder/displayer has a body 10 that is of sufficient size to accommodate a hang-tag 60, but not significantly larger than a vehicle sun visor. FIG. 1 shows the back of the body 10, and FIGS. 2, 3, and 4 show the front. The body 10 may be rectangular and flat or may take other configurations. The body 10 may be made of rigid foam or similar materials, and may measure approximately 11½ inches by 6 inches.

The body 10 attaches to a vehicle sun visor by elastic straps or bands 50 or other appropriate fasteners. Such fasteners may be seen in FIG. 1. The body 10 may be attached to an automobile sun visor on the side of the sun visor that faces the driver of the vehicle when the sun visor is raised. Thus, the body 10 is in full view to the driver when the sun visor is not in use, and the hang-tag 60 is to the outside facing the windshield when the sun visor is lowered.

As seen in FIGS. 2, 3, and 4, when the body 10 is in position on a lowered sun visor, there is a hanging device 20 upon which the hang-tag 60 may be hung on one of the lower corners of the front surface of the body 10. The hanging device 20 may be an axial extending post, or a button type or spring-loaded tension device. The hanging device 20 pivotally supports the hook portion of the hang-tag. The hanging device 20 allows the hang-tag 60 to rotate or swivel from a vertical position of hanging straight down from the hanging device 20 to a horizontal position, or approximately 90° from the vertical position, such that the hang-tag 60 is parallel to and is stored in full view of the driver when the sun visor is raised. FIG. 2 shows the hang-tag in a horizontal position, and FIGS. 3 and 4 show the hang-tag in a vertical position. FIGS. 3 and 4 further show that the hanging device 20 may be located on either the right or left lower corner of the front surface of the body 10.

When the body 10 in is position on a vehicle sun visor, there is a securing device 30 that allows the hang-tag 60 to be secured in the horizontal position on the upper corner opposite the hanging device 20. The securing device 30 may be a clip or a clip-like device.

The body 10 may have a pouch 40 in which business cards, advertising, appointment cards, or other small items may be stored, as seen in FIGS. 3 and 4. The pouch 40 may be clear to allow the items stored therein to be visible therethrough. The pouch 40 may be positioned on the front surface of the body 10 such that it is visible when the hang-tag 60 is in a vertical position.

In order to install and use, the body 10 is removably secured to a vehicle sun visor by the elastic bands 50 or other appropriate non-invasive fasteners. The body 10 may be mounted or attached to a vehicle sun visor on the side of the sun visor that faces the driver of the vehicle when the sun visor is raised so that the body 10 will be visible to the driver when the sun visor is raised.

With the sun visor in the raised position, the hook portion of the hang-tag 60 is hung from the hanging device 20. The hang-tag 60 may be rotated or swivelled into a horizontal position and secured in such position by means of the securing device 30. The sun visor may then be lowered while driving to block the sun without the hang-tag 60 obscuring the driver's view.

When a user wishes to display the hang tag 60, the user may release the hang tag 60 from the securing device 30, allowing it to swivel on the hanging device 20 into a vertical position. The hang tag 60 is therefore properly displayed so long as the hang tag 60 remains in a vertical position and the sun visor remains lowered. To store after use, the user again swivels the hang-tag 60 into a horizontal position and secures it with the securing device 30 so that the driver's vision is not blocked when the vehicle is driven.

In summary, in order to install the present invention and use with a vehicle, initially the vehicle sun visor is lowered by rotating the sun visor about its shaft. The body 10 is mounted to the vehicle sun visor with the elastic straps or bands facing the driver with the hanging device extending post 20 on the opposite side. The sun visor may then be lifted or moved back to the stored position. The hang-tag or placard is then attached to the body 10 suspending from the hanging device 20. The hang-tag is also placed in the securing device 30.

Once the vehicle is in a parked position, the device is used by raising the hang-tag to the vertical position, then lowering the vehicle sun visor so that the body 10 faces the windshield.

In order to store the device, the sun visor is rotated or moved to the raised position and the handicap hang-tag is secured to the securing device 30.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A combination hang-tag holder and displayer comprising:
   a body with a front, back, right side, left side, top, and bottom;
   one or more elastic band fasteners of sufficient size to removably attach said body to a vehicle sun visor wherein said body is attached to said sun visor facing the driver when the sun visor is raised;
   an axial hanging device located on the front of said body, either on the left side or right side, such that a hang-tag having a hook portion may be temporarily hung from said hanging device by said hook portion without requiring physical modifications to said hang-tag while permitting rotational movement of said hang-tag, and such that said hang-tag may be hung on or removed from said hanging device without the use of tools; and
   a securing device located on the front of said body on the upper corner opposite said hanging device.

2. The combination hang-tag holder and displayer of claim 1 where said hanging device and said securing device are spaced sufficiently apart such that a hang-tag may be hung from said hanging device and secured by said securing device such that said hang-tag is substantially horizontal.

3. The combination hang-tag holder and displayer of claim 1 where said body is of sufficient size to accommodate a hang-tag, but not significantly larger than said automobile sun visor.

4. The combination hang-tag holder and displayed of claim 1 wherein said hanging device is an extending post.

5. The combination hang tag holder and displayer of claim 1 wherein said hanging device is a button type device, wherein button type device refers to the structure of the hanging device.

6. The combination hang-tag holder and displayer of claim 1 wherein said hanging device is a spring-loaded tension device.

7. The combination hang-tag holder and displayer of claim 1 wherein said securing device is a clip.

8. The combination hang-tag holder and displayer of claim 1 further comprising a pouch attached to said body.

9. The combination hang-tag holder and displayer of claim 8 wherein said pouch is of sufficient size to hold business cards, advertising, appointment cards, or other small items.

10. The combination hang-tag holder and displayer of claim 8 wherein said pouch is clear.

11. A method of storing and displaying a hang-tag, comprising:
   lowering an automobile sun visor;
   attaching a hang-tag holder/displayer to said automobile sun visor, where said hang-tag holder/displayer comprises:
      a body with a front, back, right side, left side, top, and bottom;
      one or more elastic band fasteners of sufficient size to removably attach said body to an automobile sun visor wherein said body is attached to said sun visor facing the driver when the sun visor is raised;
      a hanging device located on the front of said body, either on the left side or right side, such that a hang-tag with a hook portion may be temporarily hung from said hanging device by said hook portion without requiring physical modifications to said hang-tag, and such that said hang-tag may be hung on or removed from said hanging device without the use of tools; and
      a securing device located on the front of said body on the upper corner opposite said hanging device;
   hanging a hang-tag from said hanging device such that said hang-tag is in a substantially vertical position;
   allowing said hang-tag to remain in said substantially vertical position while display of said hang-tag is desired;
   rotating said hang-tag from said substantially vertical position to a substantially horizontal position toward said securing device when display of said hang-tag is not desired; and
   securing said hang-tag with said securing device.

12. A combination holder and displayed for a hang-tag with a hook portion comprising:
   a body having at least one non-invasive fastener to removably attach said body to a vehicle sun visor wherein said body is attached to said sun visor facing the driver when the sun visor is raised;
   an axial support post extending from said body to pivotally support and suspend said hang-tag by said hook portion such that said hang-tag may be hung on or removed from said axial support post without the use of tools;
   a securing device extending from said body and spaced from said axial support post to secure said hang-tag.

* * * * *